United States Patent
Yun et al.

(10) Patent No.: US 10,775,631 B2
(45) Date of Patent: Sep. 15, 2020

(54) ELECTRONIC DEVICE INCLUDING MOISTURE INDUCTION STRUCTURE

(71) Applicant: SAMSUNG ELECTRONICS CO., LTD., Suwon-si, Gyeonggi-do (KR)

(72) Inventors: Sukjin Yun, Suwon-si (KR); Seunghoon Kang, Suwon-si (KR); Kyeongsoo Kim, Suwon-si (KR); Jaecheon Kim, Suwon-si (KR); Hongki Moon, Suwon-si (KR); Yoonsun Park, Suwon-si (KR); Hyunjin Bai, Suwon-si (KR); Jaewook Jeong, Suwon-si (KR); Seungbo Hong, Suwon-si (KR); Jiseong Hwang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/279,056

(22) Filed: Feb. 19, 2019

(65) Prior Publication Data
US 2019/0258065 A1   Aug. 22, 2019

(30) Foreign Application Priority Data
Feb. 22, 2018   (KR) ........................ 10-2018-0020913

(51) Int. Cl.
*G02B 27/01* (2006.01)
*G02B 27/00* (2006.01)
*G06F 1/18* (2006.01)

(52) U.S. Cl.
CPC ..... *G02B 27/0176* (2013.01); *G02B 27/0006* (2013.01); *G02B 27/017* (2013.01);
(Continued)

(58) Field of Classification Search
CPC ........... G02B 27/0176; G02B 27/0006; G02B 27/017; G02B 27/0172; G02B 2027/0118; G06F 1/182
See application file for complete search history.

(56) References Cited

U.S. PATENT DOCUMENTS 10,007,350 B1 *   6/2018   Holz ................. G02B 27/017
10,055,887 B1 *   8/2018   Gil .................... H04N 7/183
(Continued)

FOREIGN PATENT DOCUMENTS

JP   2015-169816 A   9/2015
WO   2017/117675   7/2017

OTHER PUBLICATIONS

Extended Search Report dated Jul. 11, 2019 in counterpart European Patent Application No. EP19158021.6.
(Continued)

*Primary Examiner* — Sejoon Ahn
(74) *Attorney, Agent, or Firm* — Nixon & Vanderhye P.C.

(57) ABSTRACT

According to various embodiments, an electronic device includes: a housing including: a first plate; a second plate facing a direction opposite a direction of the first plate; and a sidewall surrounding a first space between the first plate and the second plate, the first space being a sealed space; and at least one electronic component arranged in the first space of the housing, wherein at least a part of the sidewall of the housing includes a moisture induction portion configured to induce moisture in the first space to be generated in a moisture induction region of the moisture induction portion that may be due, for example, to a difference in temperature between the first space and an external environment.

15 Claims, 12 Drawing Sheets

(52) U.S. Cl.
CPC ......... *G02B 27/0172* (2013.01); *G06F 1/182* (2013.01); *G02B 2027/0118* (2013.01)

(56) References Cited

U.S. PATENT DOCUMENTS

| | | | |
|---|---|---|---|
| 10,334,076 B2* | 6/2019 | McKenzie | H04L 67/18 |
| 2003/0141568 A1* | 7/2003 | Sato | H01L 23/5256 |
| | | | 257/529 |
| 2008/0122993 A1 | 5/2008 | Nakamichi et al. | |
| 2016/0133201 A1* | 5/2016 | Border | G02B 27/283 |
| | | | 345/694 |
| 2016/0255748 A1* | 9/2016 | Kim | H05K 7/20972 |
| | | | 361/695 |
| 2017/0011210 A1* | 1/2017 | Cheong | A61B 5/0022 |
| 2017/0184863 A1 | 6/2017 | Balachandreswaran et al. | |
| 2017/0276932 A1 | 9/2017 | Iwata | |
| 2017/0370013 A1 | 12/2017 | Bahar et al. | |
| 2019/0235244 A1* | 8/2019 | Kamiya | G02B 27/0179 |

OTHER PUBLICATIONS

European Office Action dated Jul. 2, 2020 for European Application No. 19158021-6.

\* cited by examiner

ELECTRONIC DEVICE INCLUDING MOISTURE INDUCTION STRUCTURE

CROSS-REFERENCE TO RELATED APPLICATION

This application is based on and claims priority under 35 U.S.C. § 119 to Korean Patent Application No. 10-2018-0020913, filed on Feb. 22, 2018, in the Korean Intellectual Property Office, the disclosure of which is incorporated by reference herein in its entirety.

BACKGROUND

Field

The present disclosure relates to an electronic device including a moisture induction structure.

Description of Related Art

Portable electronic devices are used not only individually but also by interworking with various peripheral devices to be more efficient. For example, an electronic device may perform a function by interworking with a wearable electronic device wearable on a user's body. The wearable electronic device may include a watch type wearable electronic device which is worn on user's wrist and performs at least some functions of a portable electronic device on behalf of the portable electronic device, and a head mount device (HMD) which is worn on user's head and provides a user with an image displayed from a display more realistically.

In particular, the HMD may provide a user with virtual reality or augmented reality as an image, and provide the user with more realistic contents based on the virtual reality or augmented reality.

In recent years, the functionality of the HMD is more diversified, and the HMD is developing to enhance structural reliability.

The above information is presented as background information only to assist with an understanding of the present disclosure. No determination has been made, and no assertion is made, as to whether any of the above might be applicable as prior art with regard to the present disclosure.

An electronic device such as an HMD may include a housing including an inner space, a display arranged in the inner space of the housing, and a pair of lenses arranged to be exposed through at least a part of the housing. The lenses and the display are arranged in the sealed inner space of the housing, such that inflow of external foreign substances can be prevented and contamination can be avoided.

However, steam existing in air in the sealed inner space of the electronic device may be condensed on surfaces of the lenses in the inner space since temperature is transferred along the surfaces of the lenses due to an abrupt change in external temperature (for example, a change from high temperature to low temperature). For example, when the electronic device moves from an environment of high temperature to an environment of relatively low room temperature, air in the inner space of the housing may cause moisture in the sealed space due to a difference from the external temperature abruptly reduced, and the moisture may be retained on the lenses, the display, and/or various electronic components in the sealed space, and visibility through the lenses may be greatly reduced, and malfunction or damage (for example, abrasion) of the electronic components may be caused due to the moisture.

SUMMARY

Various embodiments of the present disclosure provide an electronic device including a moisture induction structure.

Various embodiments of the present disclosure provide an electronic device including a moisture induction structure, which can induce moisture into a desired position in a sealed space of a housing.

According to various embodiments of the present disclosure, an electronic device includes: a housing including: a first plate; a second plate facing a direction opposite the first plate; and a sidewall surrounding a first space between the first plate and the second plate, the first space being a sealed space; and at least one electronic component disposed in the first space of the housing, wherein at least a part of the sidewall of the housing includes a moisture induction structure (for example, and without limitation, a recessed portion of the sidewall, a plate closing an opening in the sidewall, or the like) configured to induce moisture in the first space to be generated in a moisture induction region including the moisture induction portion of the sidewall which may be due, for example, to a difference in temperature between the first space and an external environment.

According to various embodiments, an electronic device includes: an internal housing including: a first plate; a second plate facing in a direction opposite the first plate; and a sidewall surrounding a space between the first plate and the second plate, and providing a sealed first space; an external housing arranged to surround at least a part of the internal housing, and providing a second space between the external housing and the internal housing; and at least one electronic component disposed in the first space of the internal housing, wherein a part of the internal housing and/or the external housing includes at least one vent configured to allow external air to flow into the second space.

Various embodiments of the present disclosure provide a moisture induction structure to induce moisture into a desired position in a sealed space of a housing, such that reduction of reliability of an electronic device caused by moisture generated at an unintended position can be prevented and/or reduced.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, an electronic device including a moisture induction structure according to various example embodiments of the present disclosure will be described in greater detail with reference to the accompanying drawings.

Although an HMD will be described as an example of an electronic device, it will be apparent that various embodiments of the present disclosure are applicable to various electronic devices including a housing having a sealed structure and having at least one electronic component arranged therein.

Figure 1:
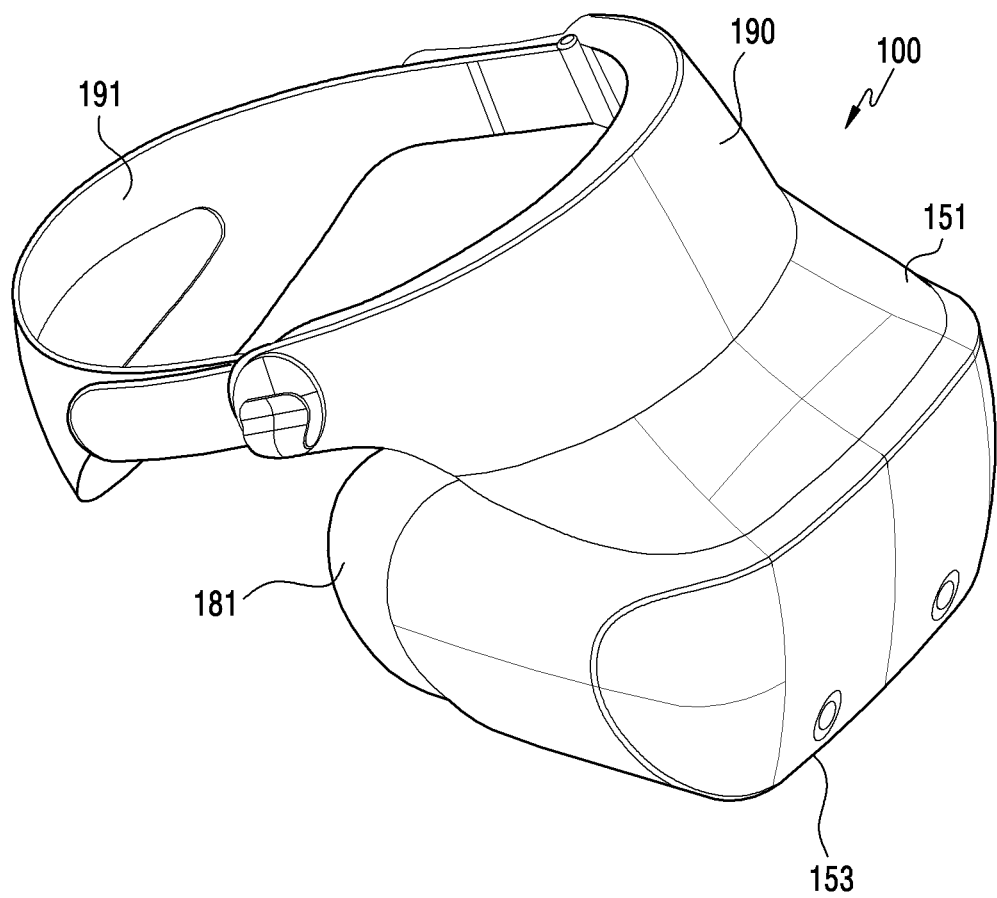
FIG. 1 is a perspective view of an electronic device according to various embodiments of the present disclosure.

FIG. 1 is a perspective view of an electronic device 100 according to various embodiments of the present disclosure.

Referring to FIG. 1, the electronic device 100 may include an HMD. According to an embodiment, the electronic device 100 may include an external housing 151 substantially forming an exterior of the electronic device 100, a cover window 153 arranged on one side of the external housing 151, and a face support member 181 arranged at a position opposite the cover window 153 of the external housing 151. According to an embodiment, the face support member 181 may include a material (for example, rubber, urethane, or silicon) which is deformable to correspond to bending parts of user's face. According to an embodiment, the cover window 153 may include, for example, and without limitation, glass of a transparent or translucent material, a polymer material, or the like. According to an embodiment, the electronic device 100 may include a head support member 190 disposed at one end of the external housing 151, and an attachment member 191 (for example, a rubber band or strap) disposed at the head support member 190 to closely fix the electronic device 100 to a head portion (HP) of a human body.

According to various embodiments, the electronic device 100 may provide virtual reality (VR) or augmented reality (AR) to a user as an image, and may provide a realistic content to the user based on the virtual reality or the augmented reality. According to an embodiment, the electronic device 100 may be functionally connected with an external electronic device. For example, the electronic device 100 may be functionally connected with the external electronic device wirelessly through short-range communication circuitry (for example, WiFi, Bluetooth, Zigbee, or near field communication (NFC)), or in a wired manner through a cable, thereby being able to output data provided from the external electronic device. For example, the electronic device 100 may include a display (for example, a display 130 of FIG. 3), and may output image data provided from the external electronic device through the display. According to an embodiment, the electronic device 100 may include at least one speaker device (for example, speaker devices 171, 172 of FIG. 3), and may output sound data provided from the external electronic device through the at least one speaker device.

According to various embodiments, the electronic device 100 may output data obtained through at least one electronic component arranged therein through another electronic component arranged therein, or may provide the data to the external electronic device. According to an embodiment, the electronic device 100 may include at least one microphone device (for example, microphone devices 173, 174 of FIG. 3), and may provide sound data collected from the microphone device to the external electronic device. According to an embodiment, the electronic device 100 may include at least one camera device (for example, a camera device 163 of FIG. 3), and may output image data obtained from the camera device through the display (for example, the display 130 of FIG. 3), or may provide the image data to the external electronic device. According to an embodiment, the electronic device 100 and/or the external electronic device may perform a positioning tracking operation by using the image data collected through the at least one camera device. According to an embodiment, the electronic device 100 may include at least one proximity sensor (for example, a proximity sensor 175 of FIG. 3), and may trigger a specific operation (for example, a start mode or a display-on operation) of the electronic device 100 using proximity sensing information obtained from the proximity sensor.

FIGS. 2A, 2B, 2C and 2D are perspective views illustrating the electronic device 100 of FIG. 1 as viewed from different directions according to various embodiments of the present disclosure.

Referring to FIGS. 2A, 2B, 2C and 2D, the electronic device 100 may include an internal housing 110 having at least a part thereof arranged in the inner space of the external housing 151 forming the exterior of the electronic device 100. According to an embodiment, the internal housing 110 may include the display (for example, the display 130 of FIG. 3) arranged one one side, and a pair of optical lenses 121, 122 arranged on the other side. Accordingly, the user may view an image outputted to the display (for example, the display 130 of FIG. 3) through the pair of optical lenses 121, 122.

According to various embodiments, the electronic device 100 may include a first space (for example, first spaces 1101, 1102 of FIG. 5A) formed in the internal housing 110 and including the optical lenses 121, 122, and the display (for example, the display 130 of FIG. 3), and may include a second space (for example, a second space 1501 of FIG. 5A) formed between the internal housing 110 and the external housing 151. According to an embodiment, the first space may be a sealed space. According to an embodiment, the first space may be isolated from the outside, thereby blocking inflow of foreign substances such as dust flowing into the internal housing 110 in advance, and thus preventing and/or reducing contamination of the optical lenses 121, 122 and the display.

According to various embodiments, moisture may be generated in the first space (for example, the first spaces 1101, 1102 of FIG. 5A) formed by the internal housing 110 due to a change (e.g., an abrupt change) in external temperature of an environment where the electronic device 100 is placed. For example, and without limitation, when the electronic device moves from an ambient environment of high temperature to an ambient environment of relatively low temperature, moisture may be generated inside the first space, and the generated moisture may be retained on the lenses and/or the display in the first space. Therefore, visibility may be greatly reduced or inner electronic components may be damaged (for example, corroded).

Figure 2A:
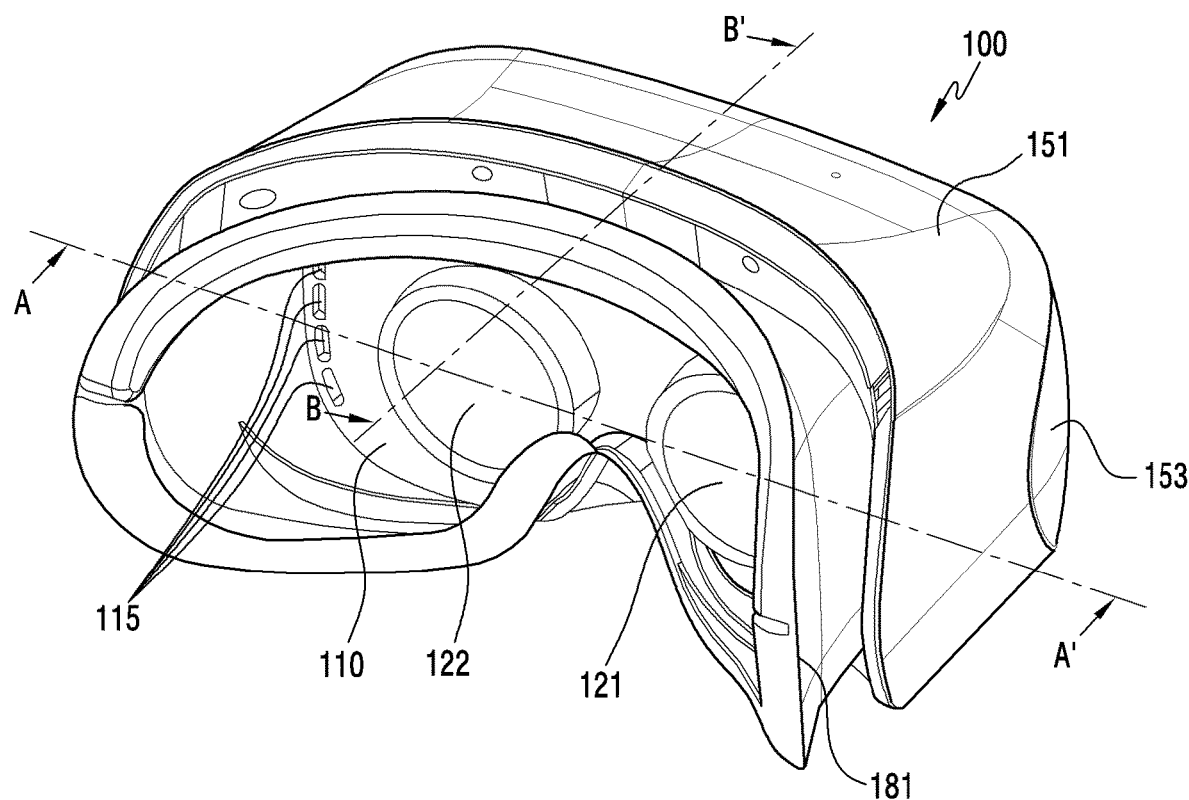
FIGS. 2A, 2B, 2C and 2D are perspective views illustrating the electronic device of FIG. 1 as viewed from different directions according to various embodiments of the present disclosure.
Figure 2B:
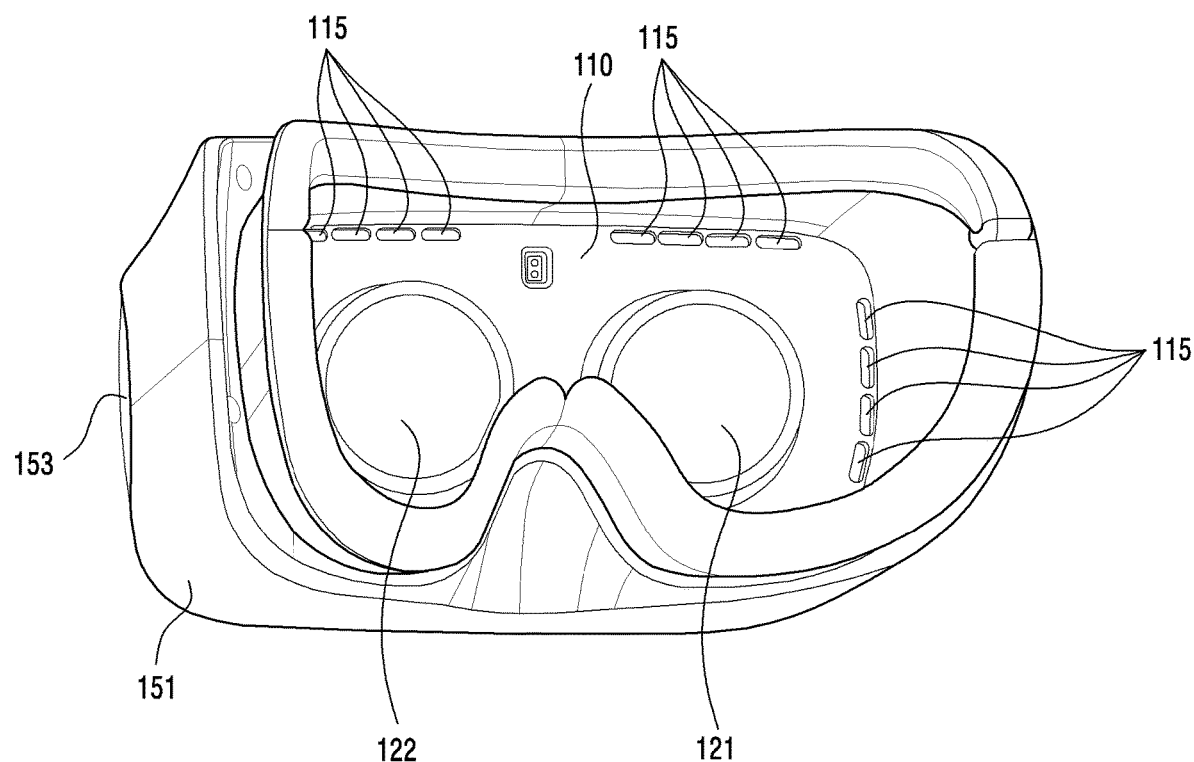
Figure 2C:
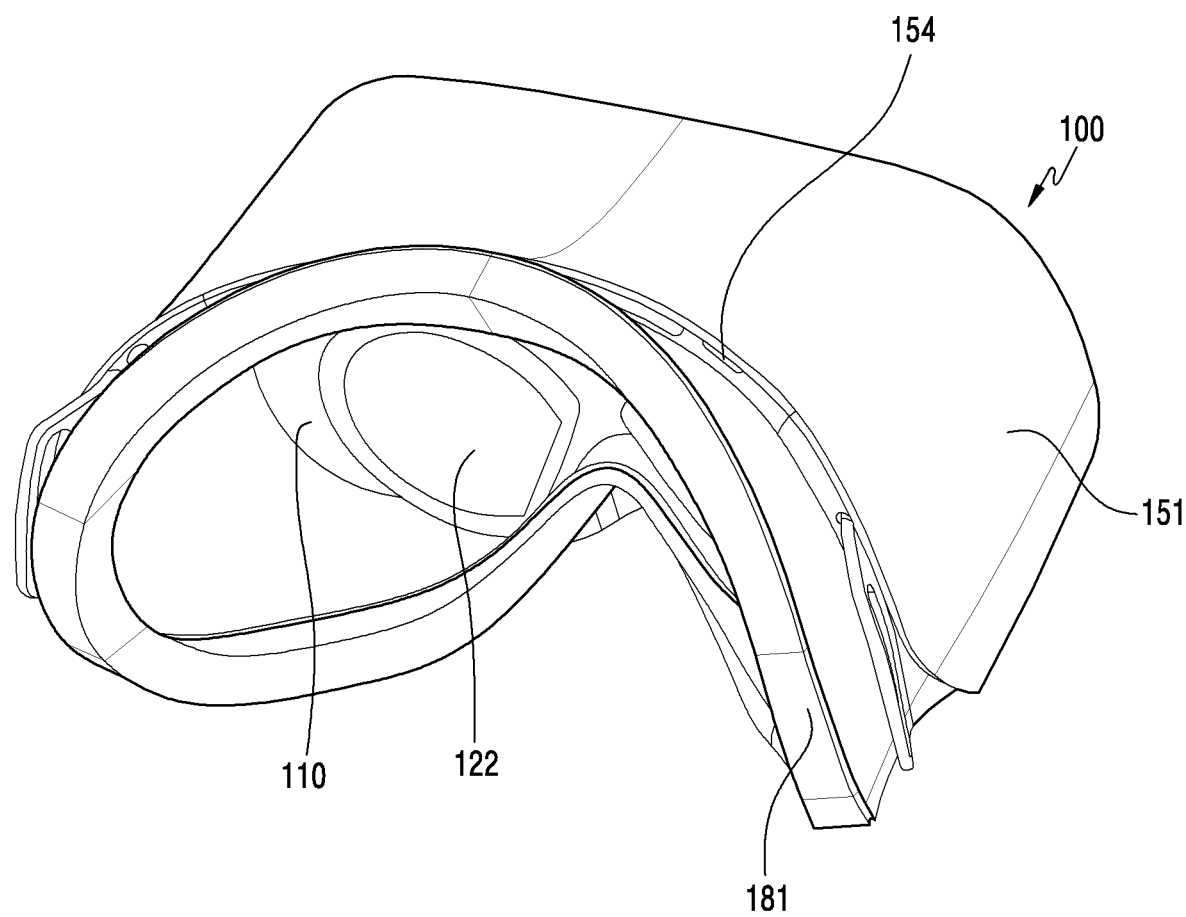
Figure 2D:
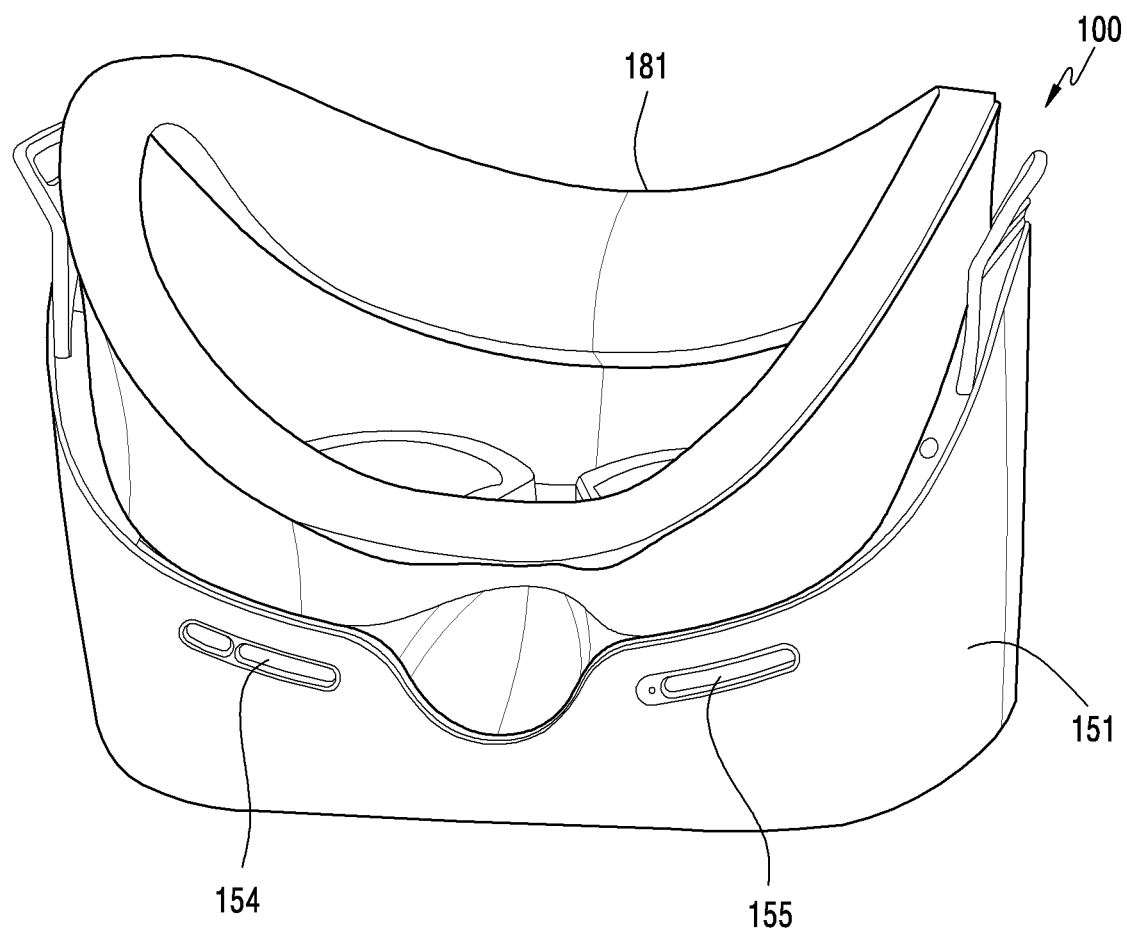

According to various embodiments, the electronic device 100 may include a moisture induction structure (region) (for example, a moisture induction structure 116 of FIG. 5A including, for example, and without limitation a recessed portion of the sidewall) to induce moisture into a region (for example, an inner sidewall region of the internal housing), rather than into the optical lenses 121, 122 and the display arranged in the first space of the internal housing 110. According to an embodiment, the electronic device 100 may include at least one vent 115, 154, 155 to allow air of the second space formed between the internal housing 110 and the external housing 151 to be mixed with external air rapidly. According to an embodiment, the at least one vent 115, 154, 155 may be arranged at a position close to a region (for example, a sidewall region) other than the regions where the optical lenses 121, 122 and the display (for example, the display 130 of FIG. 3) of the internal housing 110 are arranged. For example, as shown in FIGS. 2A and 2B, a plurality of vents 115 may be formed on a front surface plate (for example, a first plate 111 of FIG. 3) of the internal housing 110 contacting the second space (for example, the second space 1501 of FIG. 5A). Additionally, as shown in FIGS. 2C and 2D, a plurality of vents 154, 155 may be formed on corresponding regions of the external housing 151 contacting the second space. Accordingly, the first space (for example, the first spaces 1101, 1102 of FIG. 5A) of the internal housing 110 may be a sealed space and may prevent and/or reduce contamination of the optical lenses 121, 122 and the display (for example, the display 130 of FIG. 3), and moisture may be induced into a moisture induction region (for example, a sidewall region) of the first space, contacting the second space where external air is mixed and a temperature change is rapidly applied, rather than into the optical lenses 121, 122, and the display, by the second space (for example, the second space 1501 of FIG. 5A) configured to be mixed with external air rapidly by the vents 115, 154, 155. According to an embodiment, the moisture induction region may be formed to have a thickness thinner than that of a peripheral region thereof to allow the air of the second space to react to the air of the first space rapidly.

Figure 3:
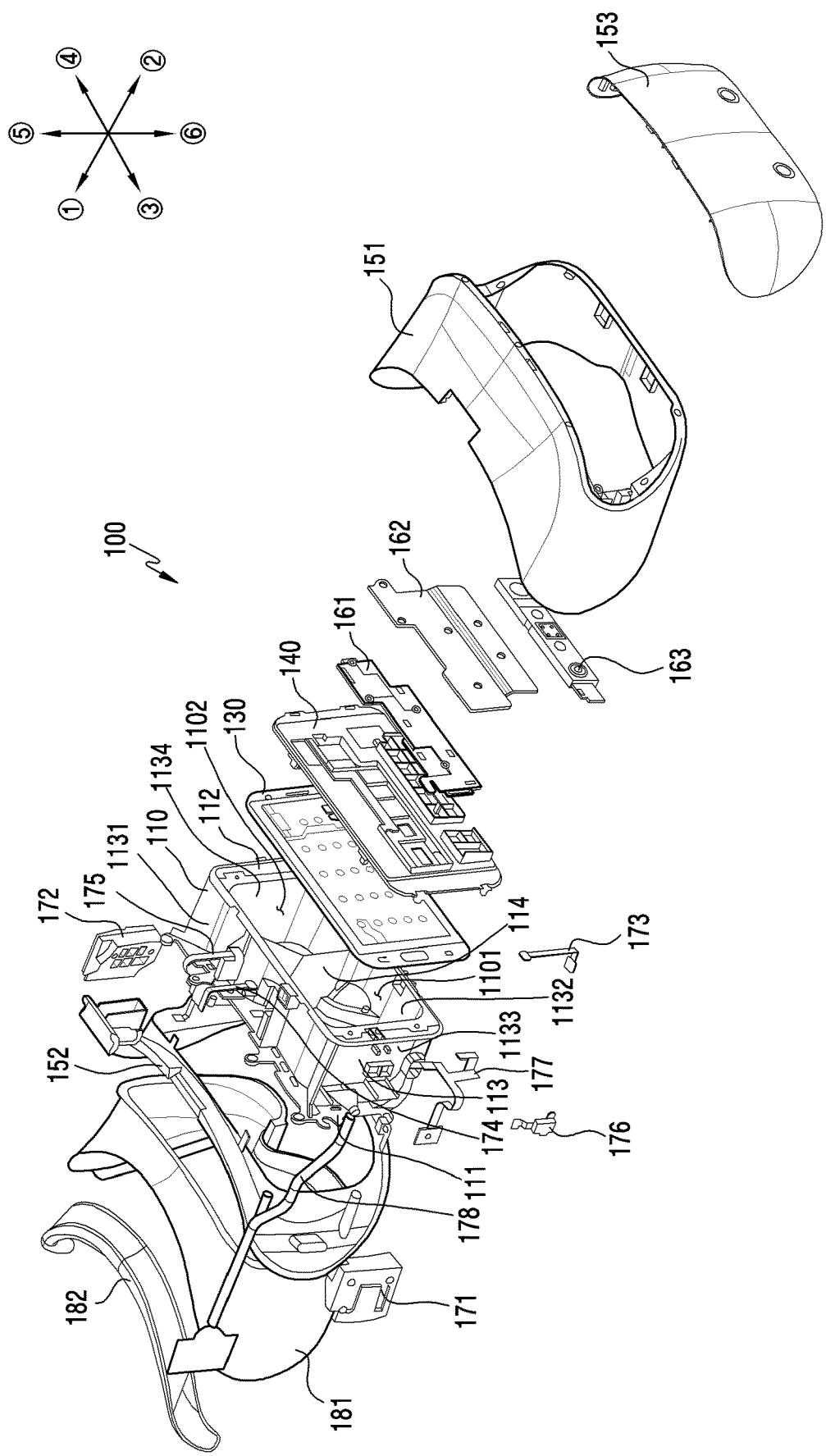
FIG. 3 is an exploded perspective view illustrating the electronic device according to various embodiments of the present disclosure.

FIG. 3 is an exploded perspective view illustrating the electronic device 100 according to various embodiments of the present disclosure.

Referring to FIG. 3, the electronic device 100 may include: the internal housing 110 which includes a first plate 111 facing a first direction (for example, a direction of ① of FIG. 3), a second plate 112 facing in the opposite direction (for example, a direction of ② of FIG. 3) of the first plate 111, and a sidewall 113 surrounding the first spaces 1101, 1102 between the first plate 111 and the second plate 112; the pair of optical lenses (for example, the optical lenses 121, 122 of FIG. 2A) arranged on at least some regions of the first plate 111 to be exposed to the outside; the display 130 arranged to have a surface, seen from the second plate 112, face an optical lens direction (for example, the direction of ① of FIG. 3); the external housing 151 arranged to surround the display 130 and the internal housing 110 at least in part; a rear surface cover 152 disposed in the first direction (for example, the direction of ① of FIG. 3) of the external housing 151; and the cover window 153 disposed in the second direction (for example, the direction of ② of FIG. 3) of the external housing 151. According to an embodiment, the electronic device 100 may include the second space (for example, the second space 1501 of FIG. 5A) formed with respect to the internal housing 110 by the external housing 151, the rear surface cover 152, the cover window 153, and the first plate 111 of the internal housing 110. According to an embodiment, the electronic device 100 may include at least one electronic component arranged in the second space.

According to an embodiment, the electronic device 100 may further include the face support member 181 and a face support portion 182 arranged from the rear surface cover 152 in sequence in the first direction (for example, the direction of ① of FIG. 3). According to an embodiment, the face support member 181 and the face support portion 182 may be formed with a material (for example, rubber, urethane, or silicon) which can allow the electronic device 100 to be smoothly worn according to bending parts of the user's face.

According to various embodiments, the internal housing 110 may include the first plate 111, the pair of optical lenses (for example, the optical lenses 121, 122 of FIG. 2A) arranged to be exposed to the outside from at least some regions of the first plate 111, the sidewall 113, the second plate 112, the display 130 arranged on the second plate 112, and sealed first spaces 1101, 1102 formed through a first support member 140 (for example, a bracket) supporting the display 130. According to an embodiment, the sidewall 113 may include a first sidewall 1131, a second sidewall 1132 arranged to be spaced from the first sidewall 1131 in parallel therewith, a third sidewall 1133 connecting one ends of the first sidewall 1131 and the second sidewall 1132, and a fourth sidewall 1134 connecting the other ends of the first sidewall 1131 and the second sidewall 1132. According to an embodiment, the first spaces 1101, 1102 may have spaces 1101, 1102 separated from each other at least in part by a partition 114 arranged from the first sidewall 1131 to the second sidewall 1132 with reference to the pair of optical lenses 121, 122.

According to various embodiments, the electronic device 100 may include at least one electronic component arranged in the second space (for example, 1501 of FIG. 5A) formed between the internal housing 110 and the external housing 151. According to an embodiment, the electronic component may be arranged between the first support member 140 and the cover window 153, and may include a printed circuit board (PCB) 161 fixed by a second support member 162. According to an embodiment, the second support member 162 may have at least a part formed with a metallic material to perform a radiating function. According to an embodiment, the electronic component may include at least one speaker device 171, 172, a microphone device 173, 174, a proximity sensor module 175, an ear jack assembly 176, a camera device 163, and an FPCB 177 and/or a cable 178 for electrically connecting the electronic components to the PCB 161, which are arranged in the second space (for example, 1501 of FIG. 5A). According to an embodiment, the electronic device 100 may output image data provided from an external electronic device or image data received from the camera device through the display 130. According to an embodiment, the electronic device 100 may output sound data provided from the external electronic device through the speaker device 171, 172. According to an embodiment, the electronic device 100 may collect ambient sound data through the microphone device 173, 174, and may provide the sound data to the external electronic device. According to an embodiment, the electronic device 100 may collect proximity sensing information through the proximity sensor module 175, and may provide the collected information to the external electronic device. According to an embodiment, the electronic device 100 may perform a positioning tracking operation by using a front image photographed by the camera device 163, or may provide photographed image data to the external electronic device. According to an embodiment, the camera device may photograph a foreground image through the cover window 153 formed with a transparent or translucent material at least in part.

According to various embodiments, the first spaces 1101, 1102 may have a sealed structure to prevent and/or reduce contamination of the optical lenses (for example, the optical lenses 121, 122 of FIG. 2A), and the display 130. According to an embodiment, the second space (for example, the second space 1501 of FIG. 5A) may fluidly communicate with the outside through the plurality of vents (for example, the vents 115, 154, 155 of FIGS. 2A to 2D) formed on at least a part of the first plate 111 contacting the second space and/or on the external housing 151. According to an embodiment, the second space may be rapidly mixed with external air due to the vents, even when the electronic device moves to an environment where temperature is abruptly changed (from an environment of high temperature to an environment of low temperature). According to an embodiment, since the sidewall 113 of the internal housing 110 contacting the second space (for example, the second space 1501 of FIG. 5A) is subject to the abruptly changed temperature first, moisture generated in the first spaces 1101, 1102 may be induced into inner side surfaces (for example, an inner side surface of FIG. 5A) of the sidewall 113.

Figure 4A:
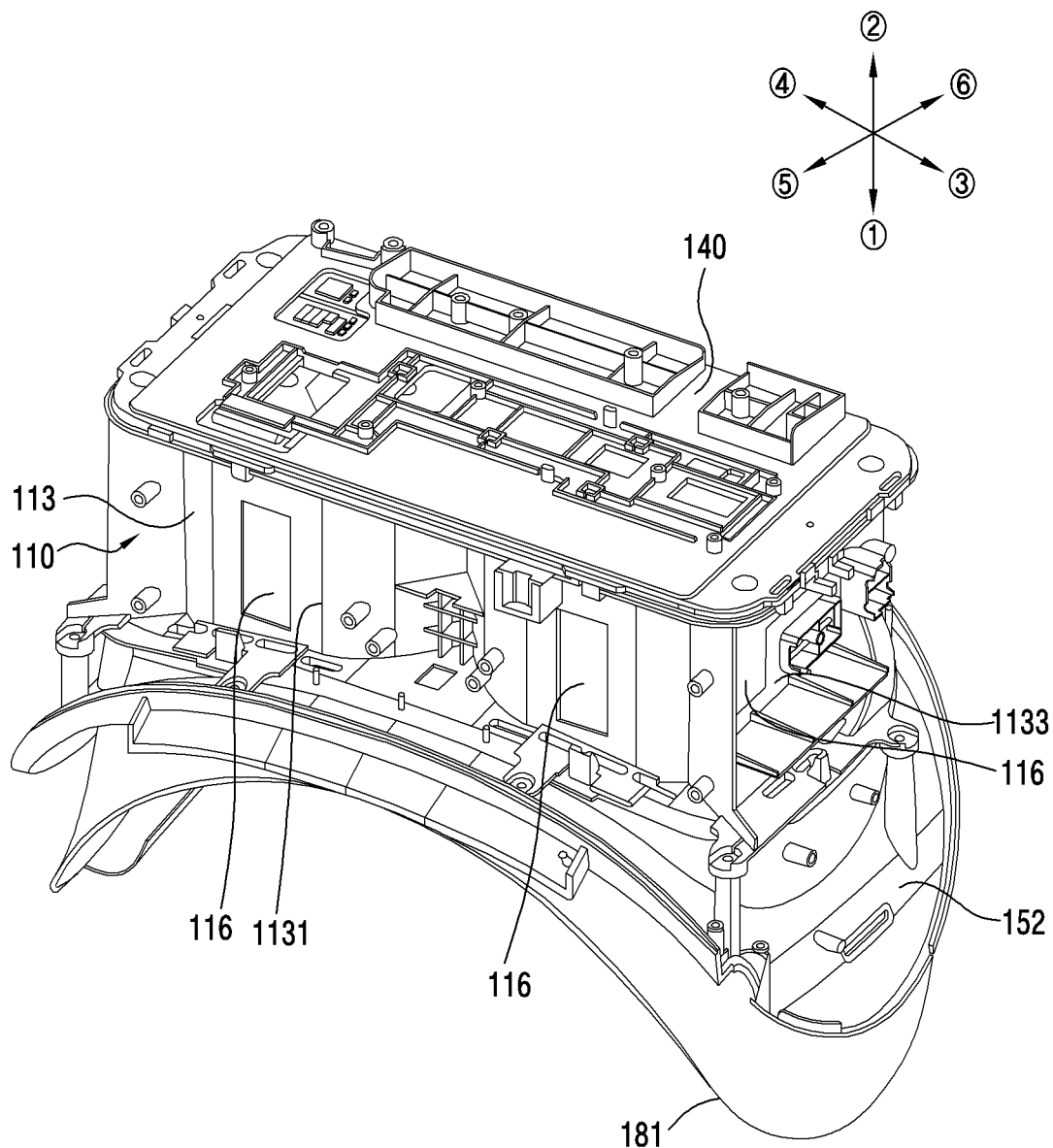
FIGS. 4A and 4B are perspective views of an internal housing of the electronic device including a moisture induction region according to various embodiments of the present disclosure.
Figure 4B:
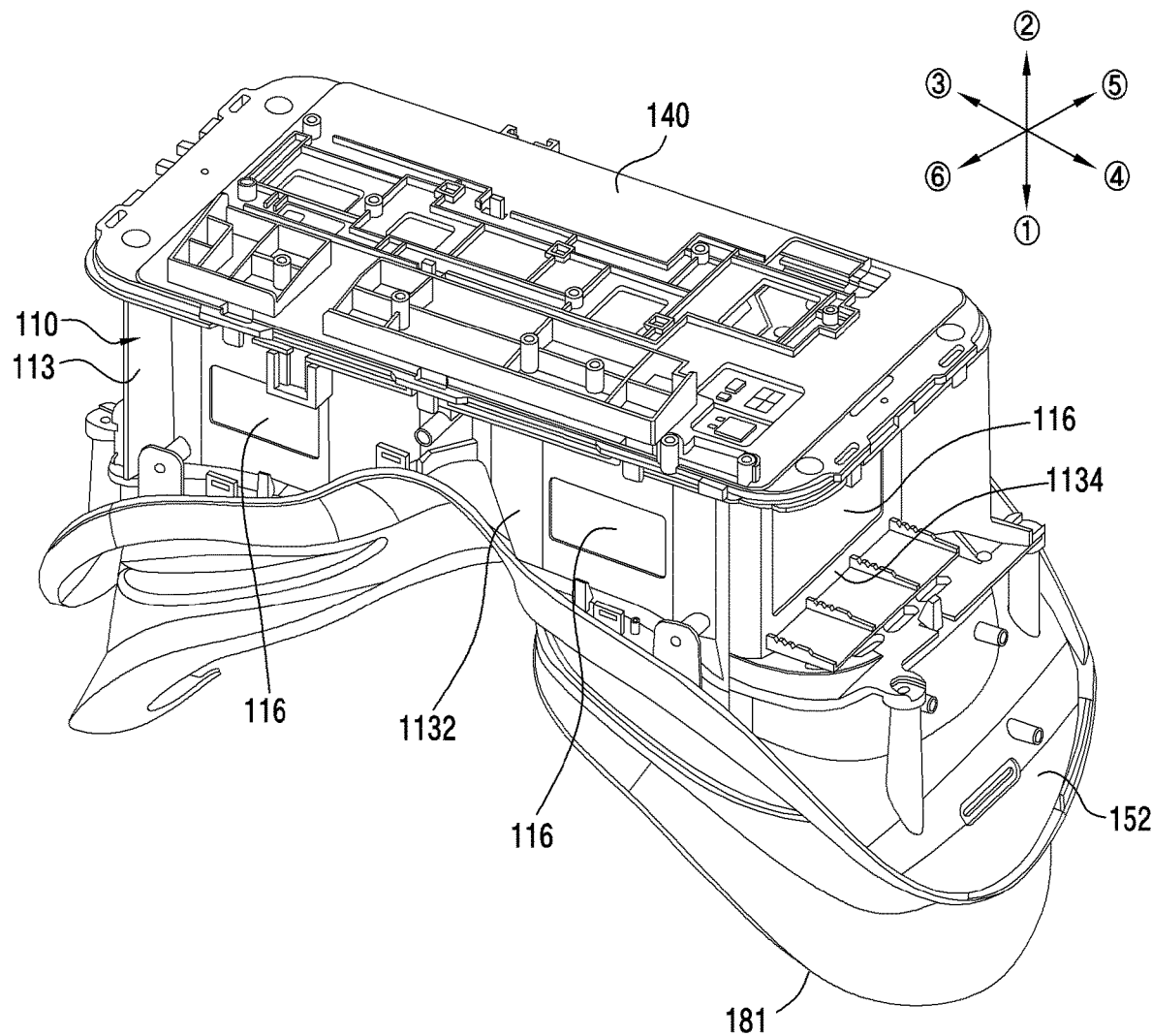

FIGS. 4A and 4B are perspective views of the internal housing 110 of the electronic device 100 including the moisture induction region 116 according to various embodiments of the present disclosure.

Referring to FIGS. 4A and 4B, the internal housing 110 may include the sidewall 113. According to an embodiment, the sidewall 113 may include the first sidewall 1131, the second sidewall 1132 facing the first sidewall 1131, the third sidewall 1133 connecting one ends of the first sidewall 1131 and the second sidewall 1132, and the fourth sidewall 1134 connecting the other ends of the first sidewall 1131 and the second sidewall 1132. According to an embodiment, at least one of the sidewalls 1131, 1132, 1133, 1134 may include the moisture induction region 116. According to an embodiment, the moisture induction region 116 may be formed to have a thickness thinner than that of a peripheral region. According to an embodiment, the moisture induction region 116 having a relatively thin thickness may allow air of the second space (for example, the second space 1501 of FIG. 5A) which is rapidly adapted to external temperature to rapidly come into contact with air of the first spaces (for example, the first spaces 1101, 1102) which are relatively slowly adapted to external temperature, such that moisture generated in the first spaces can be induced into the sidewalls 1131, 1132, 1133, 1134 of the internal housing 110, rather than into the optical lenses and/or the display.

According to various embodiments, the moisture induction region 116 may be formed along the sidewalls 1131, 1132, 1133, 1134 as shown in the drawings. According to an embodiment, the moisture induction region 116 may be formed to have a width of a range which does not influence the strength of the internal housing 110, and may be arranged at a position which is spaced from the optical lenses and/or the display as long as possible.

Figure 5A:
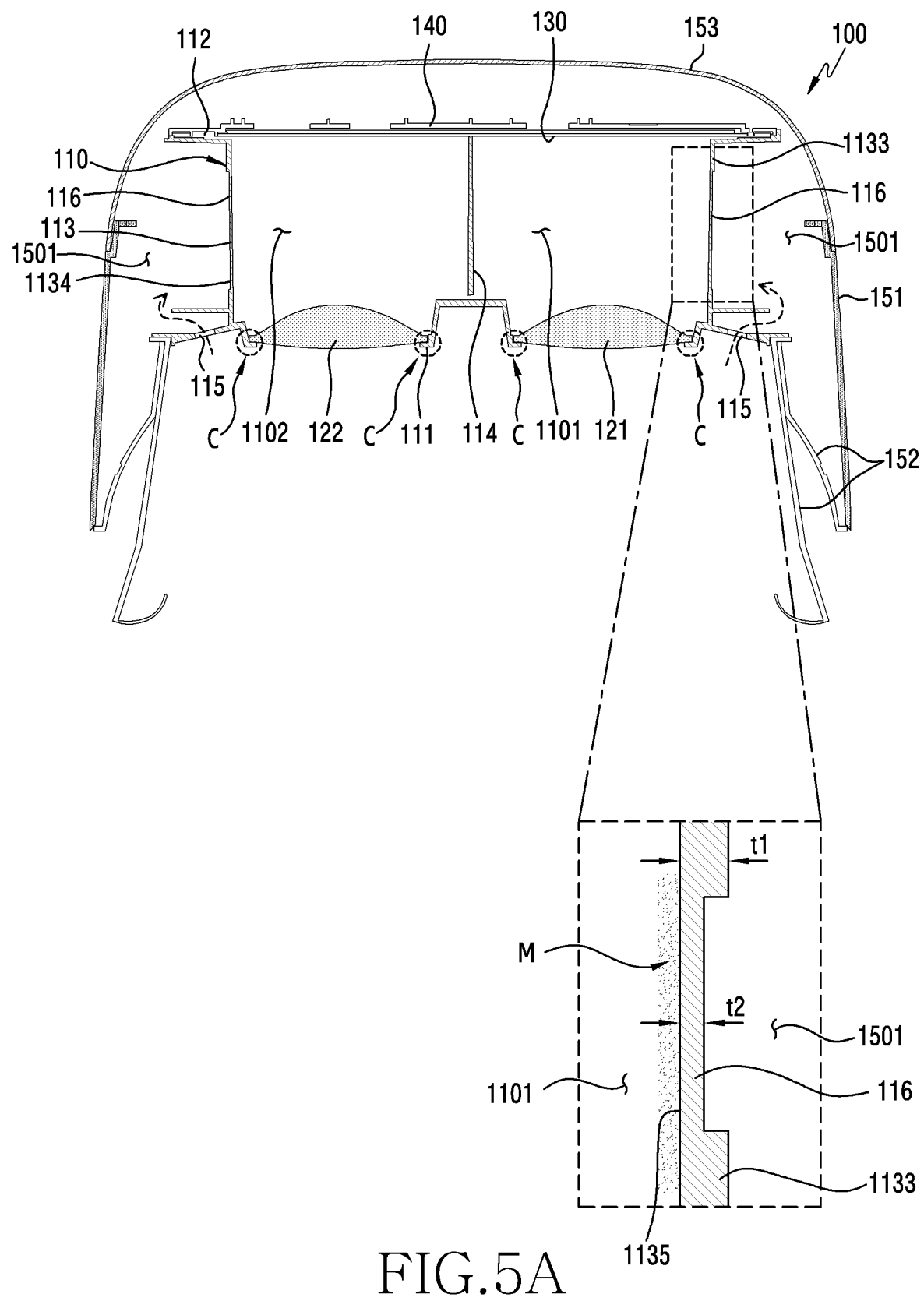
FIG. 5A is a cross-sectional view of the electronic device taken on line A-A' of FIG. 2A according to various embodiments of the present disclosure.
Figure 5B:
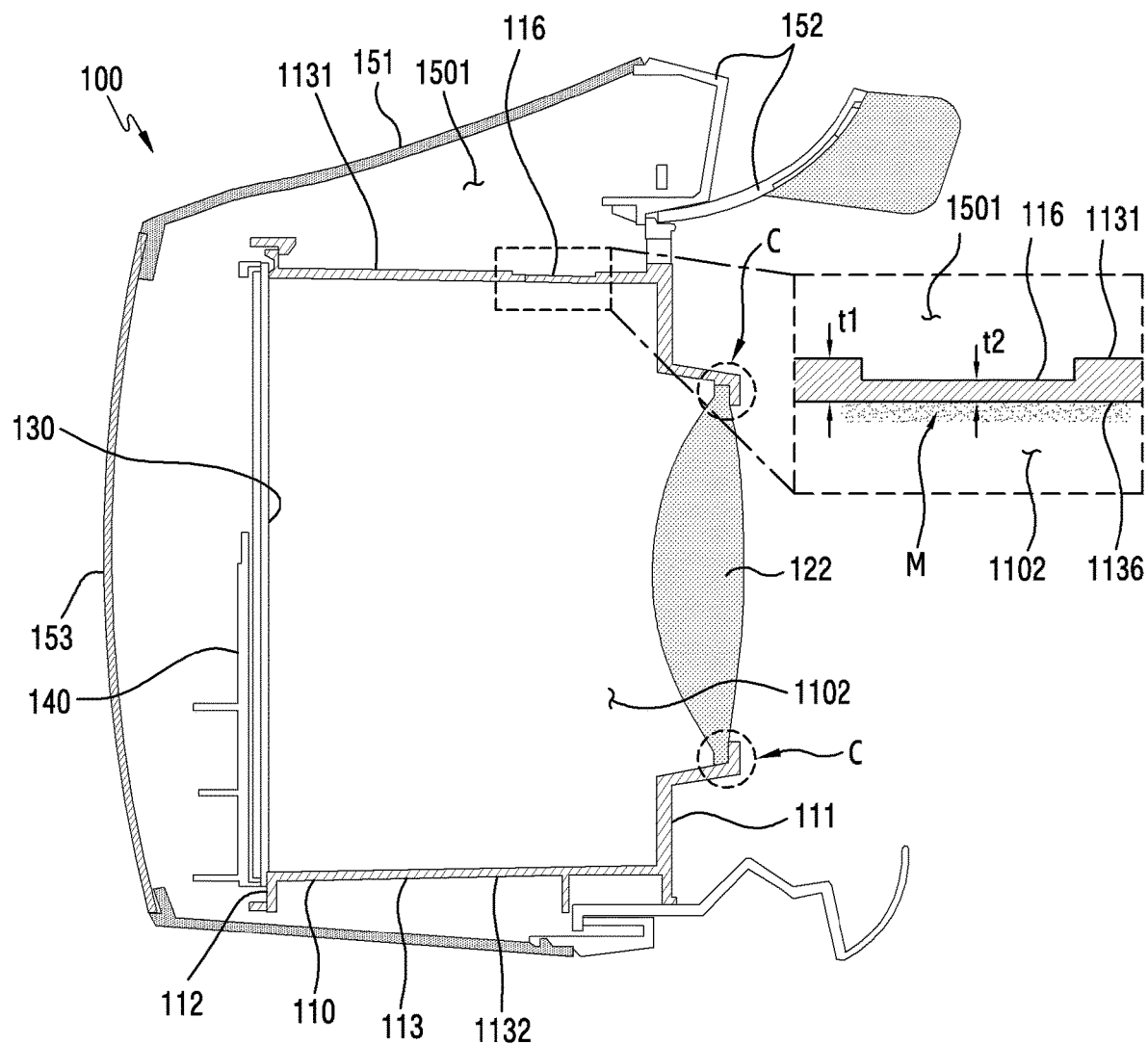
FIG. 5B is a cross-sectional view of the electronic device taken on line B-B' of FIG. 2A according to various embodiments of the present disclosure.

FIG. 5A is a cross-sectional view of the electronic device 100 taken on line A-A' of FIG. 2A according to various embodiments of the present disclosure. FIG. 5B is a cross-sectional view of the electronic device 100 taken on line B-B' of FIG. 2A according to various embodiments of the present disclosure.

Referring to FIGS. 5A and 5B, the electronic device 100 may include the first spaces 1101, 1102 of the internal housing 110 which are sealed and formed by the optical lenses 121, 122, and the display 130, and the second space 1501 arranged between the external housing 151 and the internal housing 110. According to an embodiment, the pair of lenses 121, 122 are coupled to the first plate 111 by bonding, rubber sealing, or fusing at regions (C regions) contacting the first plate 111 of the internal housing 110, such that the first spaces 1101, 1102 can be applied as sealed spaces. According to an embodiment, the second space 1501 may be formed by coupling at least a part of the internal housing 110 (for example, a part of the first plate 111) and the external housing 151 and the cover window 153. According to an embodiment, external air may flow into the second space 1501 through the vents 115 formed on the first plate 111. Although not shown, the vents 115 may satisfy a condition where external air smoothly enters, and may be blocked at least in part through a filtering member (for example, a mesh or a non-woven fabric) which can prevent and/or reduce inflow of external foreign substances.

According to various embodiments, the vents 115 may be formed in the proximity of the sidewall 113 of the internal housing 110. For example, the vents 115 may be arranged in the proximity of the first sidewall (for example, the first sidewall 1131, the third sidewall 1133, and the fourth sidewall 1134 of FIG. 3) of the internal housing. According to an embodiment, the moisture induction region 116 may be formed in the proximity of the vent 115 of each sidewall 1131, 1133, 1134. According to an embodiment, the moisture induction region 116 may be formed to have a thickness t2 which is thinner than a thickness t1 of the sidewall 1133, 1131. According to an embodiment, moisture M may be induced into the moisture induction region 116 having the thickness t2 which is relatively thinner than the thickness t1 of the sidewall 1133, 1131.

According to various embodiments, when the electronic device 100 moves from an ambient environment of high temperature to an ambient environment of relatively low temperature, the second space 1501 may rapidly react to external air by means of the vents 115 and may be mixed with the air, but the first spaces 1101, 1102, which are sealed spaced, may make the air of relatively high temperature be slowly cooled. Due to a difference in the temperature between the first spaces 1101, 1102 and the second space 1501, moisture M may be generated inside the first spaces 1101, 1102, and the generated moisture M may be induced to be retained on inner side surfaces 1135, 1136 of the moisture induction region 116 having the thickness t2 which is relatively thin, in the sidewalls 1133, 1131 of the internal housing 110.

Figure 6:
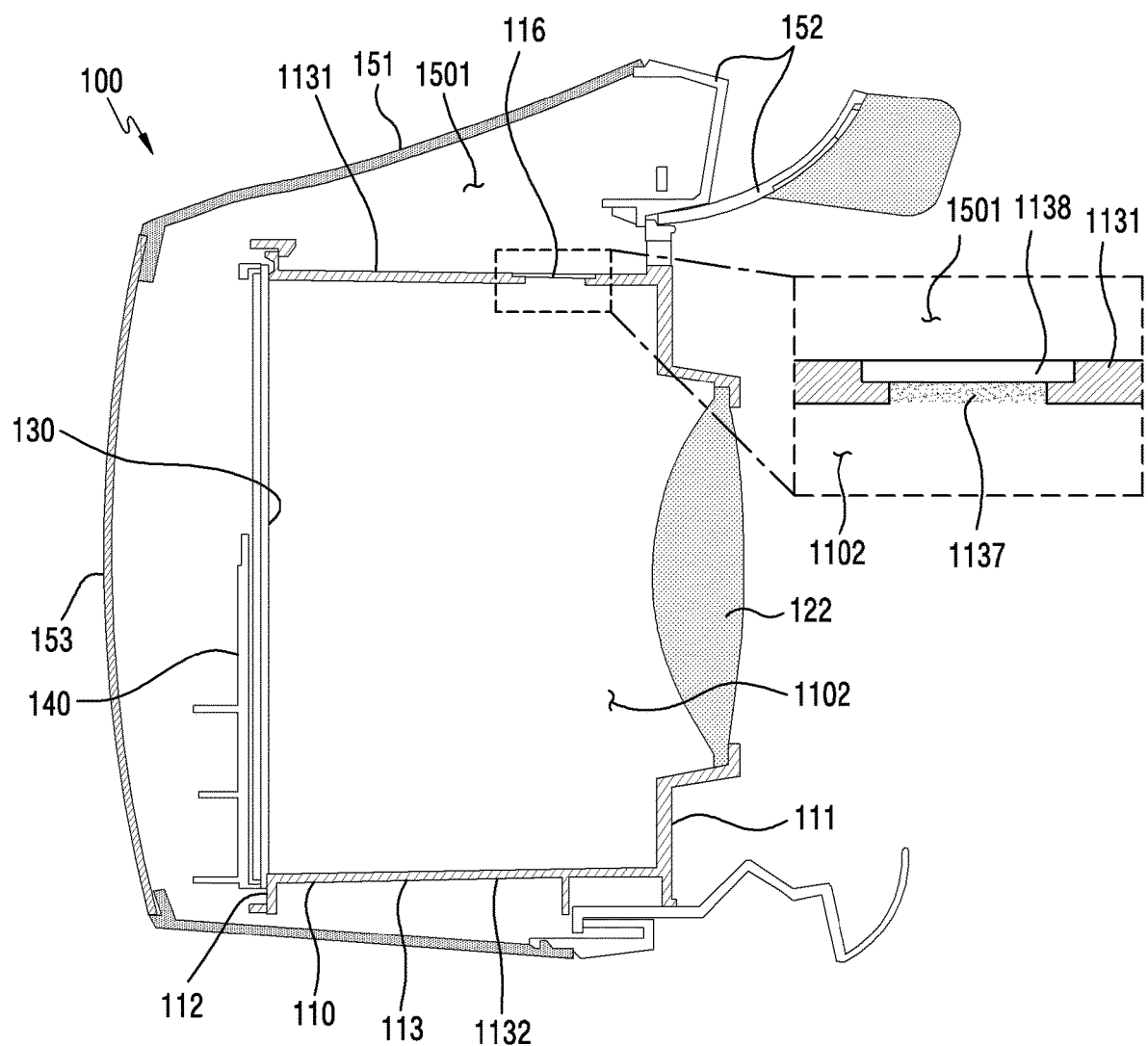
FIG. 6 is a cross-sectional view of the electronic device according to various embodiments of the present disclosure.

FIG. 6 is a cross-sectional view of the electronic device 100 according to various embodiments of the present disclosure.

Referring to FIG. 6, the sidewall 1131 of the internal housing 110 may have an opening 1137 having a predetermined size. According to an embodiment, the internal housing 110 may include a moisture induction member 1138 arranged to close the opening 1137. According to an embodiment, the moisture induction member 1138 may be formed to be relatively thinner than the thickness of the sidewall 1131. According to an embodiment, the moisture induction member 1138 may be arranged on the internal housing 110 to close the opening 1137 through bonding, fusing, insert injection, structural coupling, or the like, but is not limited thereto. According to an embodiment, the moisture induction member 1138 may include a tape, a metal plate of a thin film, plate-type PC, or the like, but is not limited thereto. Accordingly, when the electronic device moves from the environment of high temperature to the environment of relatively low temperature, the second space 1501 may rapidly react to external air through the vents 115 and may be mixed with the external air, but the first space 1102, which is a sealed space, may make the air of relatively high temperature be cooled slowly. Due to such a difference in the temperature between the first space 1102 and the second space 1501, moisture may be generated in the first space 1102 and the generated moisture may be induced to be retained on the moisture induction member 1138 which has a relatively thin thickness and closes the opening 1137 formed on the sidewall 1131 of the internal housing 110.

Figure 7:
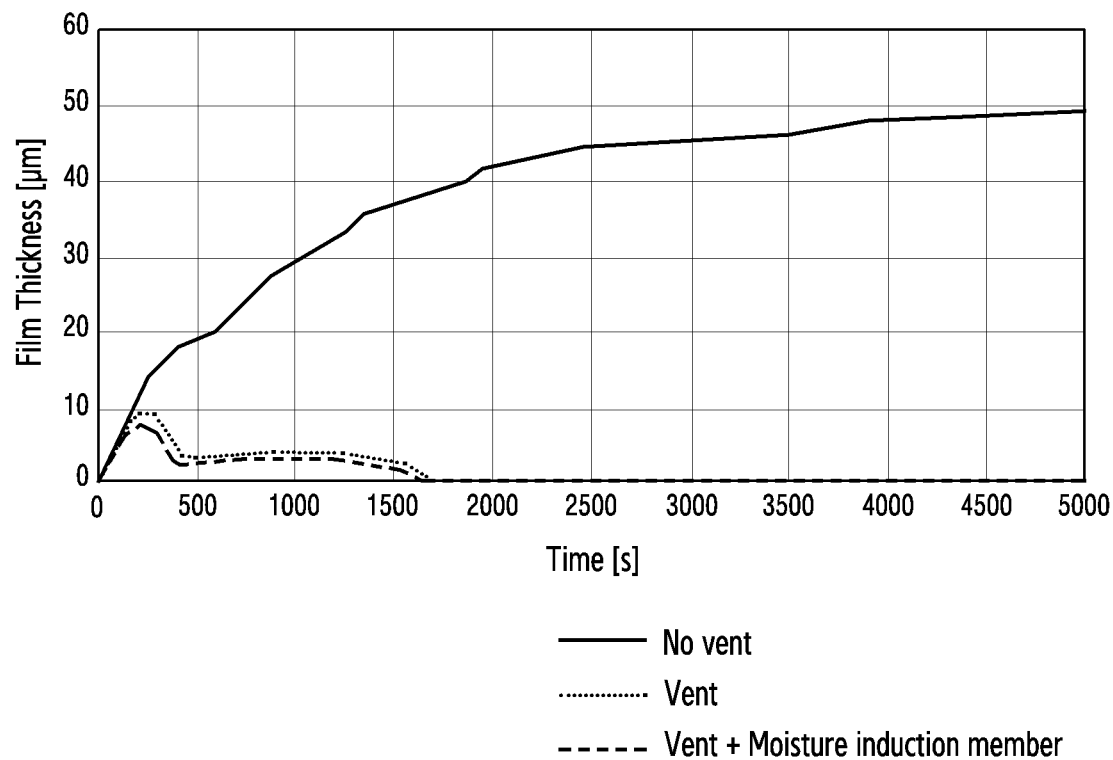
FIG. 7 is a graph illustrating comparison of a change in thickness of moisture retained on a lens according to a change in temperature according to various embodiments of the present disclosure.

FIG. 7 is a graph illustrating comparison of change in thickness of moisture retained on lenses according to change in temperature according to various embodiments of the present disclosure.

Referring to table 1 presented below and FIG. 7, when the electronic device (for example, the electronic device 100 of FIG. 5A) is sufficiently exposed to a high temperature environment of temperature of 60° C. and humidity of 95%, and then the environment is changed to an environment of room temperature of 25° C. and humidity of 50%, moisture (for example, condensation) having thickness of 49.2 μm may be retained on the optical lens (for example, the optical lenses 121, 122 of FIG. 5A) for a time of condensation of 9 seconds, and 2-3 days are required to eliminate the moisture if there is no vent (for example, if the second space 1501 is sealed). However, if the vents (for example, the vents 115 of FIG. 5A) (for example, 16 vents) of the present disclosure are applied, moisture (for example, condensation) of thickness of 8.8 μm is retained on the optical lens (for example, the optical lenses 121, 122 of FIG. 5A) for a time of condensation of 10 seconds, and 1680 seconds are required to eliminate the moisture. That is, moisture is relatively less retained on the optical lens (for example, the optical lenses 121, 122 of FIG. 5A), and the moisture is eliminated within a short time. When the vents (for example, the vents 115 of FIG. 5A) (for example, 16 vents), and the moisture induction structure (for example, the moisture induction region 116 including, for example, and without limitation, a recessed portion of the sidewall) or the moisture induction member (for example, the moisture induction member (for example, and without limitation, a plate) 1138 of FIG. 6) are applied according to an embodiment, moisture (for example, condensation) of thickness of 7.8 μm is retained on the optical lens (for example, the optical lenses 121, 122 of FIG. 5A) for a time of condensation of 10 seconds, and 1620 seconds are required to eliminate the moisture. That is, moisture is less retained on the optical lens (for example, the optical lenses 121, 122 of FIG. 5A), and the moisture is eliminated within a short time, in comparison to the case where only the vents exist.

TABLE 1

| | | Results of analysis | | | |
|---|---|---|---|---|---|
| Nos. | Conditions | Moisture occurring time | Max moisture thickness [μm] | Time required to eliminate moisture [s] | Remarks |
| 1 | No vent | 9 | 49.2 | 2-3 days | |
| 2 | Front surface vent | 10 | 8.8 | 1680 | 16 Vents |
| 3 | Front surface vent + moisture induction member (0.1t) | 10 | 7.8 | 1620 | |

According to various embodiments, an electronic device (for example, the electronic device 100 of FIG. 5A) may include: a housing (for example, the internal housing 110 of FIG. 5A) including: a first plate (for example, the first plate 111 of FIG. 5A); a second plate (for example, the second plate 112 of FIG. 5A) facing in the opposite direction of the first plate; and a sidewall (for example, the sidewall 113 of FIG. 5A) surrounding a first space (for example, the first spaces 1101, 1102 of FIG. 5A) between the first plate and the second plate, the first space being a sealed space; and at least one electronic component (for example, the optical lenses 121, 122 and/or the display 130 of FIG. 5A) arranged in the first space of the housing, and at least a part of the sidewall of the housing may include a moisture induction structure (for example, and without limitation, a recessed portion of the sidewall, a plate, or the like) configured to induce moisture in the first space to be generated in a moisture induction region including the moisture induction portion due, for example, to a difference in temperature between the first space and an external environment.

According to various embodiments, the moisture induction structure (for example, and without limitation, a recessed portion of the sidewall, a plate, or the like) may include a moisture induction region (for example, the moisture induction region 116 of FIG. 5A) having a thickness less than a thickness of a periphery of the sidewall.

According to various embodiments, the moisture induction structure may include a moisture induction member or plate (for example, the moisture induction member 1138 of FIG. 5A) arranged to close an opening (for example, the opening 1137 of FIG. 6) formed on at least a part of the sidewall.

According to various embodiments, the moisture induction member (e.g., plate) may have a thickness less than a thickness of a periphery of the sidewall.

According to various embodiments, the moisture induction member (e.g., plate) may include one or more of: a tape, a metal plate of a thin film, and/or plate-type PC.

According to various embodiments, the moisture induction member (e.g., plate) may be arranged to close the opening through at least one of: bonding, fusing, insert injection, and/or structural coupling.

According to various embodiments, the moisture induction structure (e.g., a recessed portion of the sidewall or plate) may be arranged on a sidewall of the housing spaced from the electronic component.

According to various embodiments, the electronic device may further include: an external housing (for example, the external housing 151 of FIG. 5A) arranged to surround at least a part of the housing, a second space (for example, the second space 1501 of FIG. 5A) being formed between the external housing and the housing; and at least one vent (for example, the vent 115 of FIG. 5A) formed on a part of the housing and/or the external housing, and configured to allow external air to flow into the second space.

According to various embodiments, the electronic component may include at least one optical lens (for example, the optical lenses 121, 122 of FIG. 5A) arranged to be exposed to an outside from at least a part of the first plate.

According to various embodiments, the electronic device may further include a display (for example, the display 130 of FIG. 5A) arranged to have a surface seen from the second plate, and facing the at least one optical lens.

According to various embodiments, the vent may be arranged at a position spaced from the at least one optical lens and the display arranged in the first space.

According to various embodiments, the vent may be arranged at a position close to the moisture induction structure.

According to various embodiments, the electronic device may further include: a wired communication module comprising wired communication circuitry and/or a wireless communication module comprising wireless communication circuitry configured to communicate with an external electronic device; and a display configured to output data provided from the external electronic device through the wired communication module and/or the wireless communication module.

According to various embodiments, the electronic device may include an HMD which is worn on a human body.

According to various embodiments, an electronic device (for example, the electronic device 100 of FIG. 5A) may include: an internal housing (for example, the internal housing 110 of FIG. 5A) including: a first plate (for example, the first plate 111 of FIG. 5A); a second plate (for example, the second plate 112 of FIG. 5A) facing in the opposite direction of the first plate; and a sidewall (for example, the sidewall 113 of FIG. 5A) surrounding a space between the first plate and the second plate, and providing a sealed first space (for example, the first spaces 1101, 1102 of FIG. 5A); an external housing (for example, the external housing 151 of FIG. 5A) arranged to surround at least a part of the internal housing, and providing a second space (for example, the second space 1501 of FIG. 5A) between the external housing and the internal housing; and at least one electronic component (for example, the optical lenses 121, 122 and the display 130 of FIG. 5A) arranged in the first space of the internal housing, and a part of the internal housing and/or the external housing may include at least one vent (for example, the vent 115 of FIG. 5A) formed to allow external air to flow into the second space.

According to various embodiments, the internal housing may include a moisture induction structure (e.g., a recessed portion of the sidewall or a plate) on at least a part of the sidewall.

According to various embodiments, the moisture induction structure may include a moisture induction region (e.g., a recessed portion of the sidewall) formed having a thickness less than a thickness of a periphery of the sidewall.

According to various embodiments, the moisture induction structure may include a moisture induction member (e.g., a plate) arranged to close an opening formed on at least a part of the sidewall.

According to various embodiments, the moisture induction member (e.g., plate) may have a thickness less than a thickness of a periphery of the sidewall.

According to various embodiments, the electronic device may include an HMD which is worn on a human body, and the electronic component may include at least one optical lens (for example, the optical lenses 121, 122 of FIG. 5A) arranged on the first plate to have at least a part exposed to an outside, and a display (for example, the display 130 of FIG. 5A) having a surface, seen from the second plate, face the optical lens.

The present disclosure has been described with reference to various example embodiments thereof. It will be understood by one skilled in the art that the present disclosure can be implemented in modified forms without departing from the essential characteristics of the present disclosure. Therefore, disclosed embodiments should be considered from an illustrative perspective, not from a limited perspective. The scope of the present disclosure is defined not by the detailed description but by, for example, the appended claims, and all differences within the scope should be understood as being included in the present disclosure.

What is claimed is:

1. An electronic device comprising:
a housing comprising: a first plate; a second plate facing a direction opposite a direction of the first plate; and a sidewall surrounding a first space between the first plate and the second plate, the first space being a sealed space; and
at least one electronic component disposed in the first space of the housing,
wherein at least a part of the sidewall of the housing comprises a moisture induction portion configured to induce moisture in the first space to be generated in a moisture induction region including the moisture induction portion of the sidewall,
wherein the moisture induction portion comprises a moisture induction plate arranged to close an opening formed on at least a part of the sidewall, and
wherein the moisture induction plate has a thickness less than a thickness of a periphery of the sidewall.

2. The electronic device of claim 1, wherein the moisture induction region of the moisture induction portion of the sidewall comprises a recess formed in the sidewall having a thickness that is less than a thickness of a periphery of the sidewall.

3. The electronic device of claim 1, wherein the moisture induction plate comprises one or more of: a tape, a metal plate of a thin film, and a plate-type PC.

4. The electronic device of claim 1, wherein the moisture induction plate is arranged to close the opening through one or more of: bonding, fusing, insert injection, and structural coupling.

5. The electronic device of claim 1, wherein the moisture induction portion is arranged on a sidewall of the housing spaced from the electronic component.

6. The electronic device of claim 1, further comprising:
an external housing arranged to surround at least a part of the housing, a second space formed between the external housing and the housing; and
at least one vent formed on a part of the housing and/or the external housing, the at least one vent configured to allow external air to flow into the second space.

7. The electronic device of claim 6, wherein the electronic component comprises at least one optical lens arranged to be exposed to an outside from at least a part of the first plate.

8. The electronic device of claim 7, further comprising a display having a surface seen from the second plate, and facing the at least one optical lens.

9. The electronic device of claim 8, wherein the vent is arranged at a position spaced from the at least one optical lens and the display arranged in the first space.

10. The electronic device of claim 6, wherein the vent is arranged at a position within a predetermined proximity to the moisture induction portion.

11. The electronic device of claim 1, further comprising:
a wired communication module comprising wired communication circuitry and/or a wireless communication module comprising wireless communication circuitry configured to communicate with an external electronic device; and
a display configured to output data from the external electronic device through the wired communication module and/or the wireless communication module.

12. The electronic device of claim 1, wherein the electronic device comprises a head mount device (HMD) configured to be worn on a human body.

13. An electronic device comprising:
an internal housing comprising: a first plate; a second plate facing a direction opposite a direction of the first plate; and a sidewall surrounding a first space between the first plate and the second plate, the first space being a sealed space;
an external housing arranged to surround at least a part of the internal housing, and defining a second space between the external housing and the internal housing; and
at least one electronic component disposed in the first space of the internal housing,
wherein a part of the internal housing and/or the external housing comprises at least one vent configured to allow external air to flow into the second space,
wherein the internal housing comprises a moisture induction portion arranged on at least a part of the sidewall,
wherein the moisture induction portion comprises a moisture induction plate arranged to close an opening formed on at least a part of the sidewall, and
wherein the moisture induction plate has a thickness less than a thickness of a periphery of the sidewall.

14. The electronic device of claim 13, wherein the moisture induction portion comprises a moisture induction region comprising a recessed portion of the sidewall having a thickness less than a thickness of a periphery of the sidewall.

15. The electronic device of claim 13, wherein the electronic device comprises a head mount device (HMD) configured to be worn on a human body, and
wherein the electronic component comprises at least one optical lens arranged on the first plate to have at least a part exposed to an outside, and a display having a surface seen from the second plate, and facing the optical lens.

* * * * *